(12) United States Patent
Kotani et al.

(10) Patent No.: US 11,948,787 B2
(45) Date of Patent: Apr. 2, 2024

(54) SAMPLE SUPPORT, AND MANUFACTURING METHOD OF SAMPLE SUPPORT

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 916 days.

(21) Appl. No.: 16/966,131

(22) PCT Filed: Nov. 30, 2018

(86) PCT No.: PCT/JP2018/044298
§ 371 (c)(1),
(2) Date: Jul. 30, 2020

(87) PCT Pub. No.: WO2019/155740
PCT Pub. Date: Aug. 15, 2019

(65) Prior Publication Data
US 2021/0027999 A1 Jan. 28, 2021

(30) Foreign Application Priority Data
Feb. 9, 2018 (JP) .................................. 2018-021898

(51) Int. Cl.
*H01J 49/04* (2006.01)
*C25D 1/00* (2006.01)
(Continued)

(52) U.S. Cl.
CPC ............ *H01J 49/0409* (2013.01); *C25D 1/00* (2013.01); *C25D 1/20* (2013.01); *C25D 5/02* (2013.01);
(Continued)

(58) Field of Classification Search
CPC .. H01J 49/0004; H01J 49/0418; G01N 27/62; B01L 3/5027
See application file for complete search history.

(56) References Cited

U.S. PATENT DOCUMENTS

2002/0048531 A1 * 4/2002 Fonash ............... H01J 49/0418
422/68.1
2003/0111599 A1 6/2003 Staats
(Continued)

FOREIGN PATENT DOCUMENTS

| CN | 101105473 A | 1/2008 |
| CN | 101329301 A | 12/2008 |

(Continued)

OTHER PUBLICATIONS

Fonash Stephen J. et al., "Nanostructured silicon for biomedical application", Proceedings of SPIE, vol. 4236, Dec. 13, 2000, p. 280, XP055848700.
(Continued)

*Primary Examiner* — David E Smith
*Assistant Examiner* — Hsien C Tsai
(74) *Attorney, Agent, or Firm* — Faegre Drinker Biddle & Reath LLP

(57) ABSTRACT

A sample support body is a sample support body for ionizing a sample, including: a substrate formed with a plurality of first through holes opening to a first surface and a second surface opposite to each other; and a conductive layer provided at least on a peripheral portion of the first through hole in the first surface, in which in a partition portion provided between the adjacent first through holes, a plurality of second through holes communicating the adjacent first through holes are formed.

13 Claims, 10 Drawing Sheets

(51) Int. Cl.
*C25D 1/20* (2006.01)
*C25D 5/02* (2006.01)
*C25D 11/02* (2006.01)
*C25D 11/12* (2006.01)
*G01N 27/623* (2021.01)

(52) U.S. Cl.
CPC ............ *C25D 11/022* (2013.01); *C25D 11/12* (2013.01); *G01N 27/623* (2021.01)

(56) References Cited

U.S. PATENT DOCUMENTS

| | | | |
|---|---|---|---|
| 2006/0091051 A1 | 5/2006 | Takada et al. | |
| 2007/0020918 A1* | 1/2007 | Hirokawa | B23H 5/08 438/626 |
| 2011/0123411 A1 | 5/2011 | Butler | |
| 2016/0260597 A1 | 9/2016 | Hattan | |
| 2017/0358436 A1* | 12/2017 | Naito | G01N 27/62 |

FOREIGN PATENT DOCUMENTS

| | | |
|---|---|---|
| CN | 101401002 A | 4/2009 |
| CN | 202339901 U | 7/2012 |
| CN | 103443898 A | 12/2013 |
| CN | 103592361 A | 2/2014 |
| CN | 104039237 A | 9/2014 |
| CN | 106796198 A | 5/2017 |
| JP | 2001-138300 A | 5/2001 |
| JP | 2005-500507 A | 1/2005 |
| JP | 2010-078346 A | 4/2010 |
| JP | 2014-153183 A | 8/2014 |
| JP | 6093492 B1 | 3/2017 |
| WO | WO-01/046458 A1 | 6/2001 |
| WO | WO-2017/038710 A1 | 3/2017 |

OTHER PUBLICATIONS

Ono, Sachiko, "Structure and Growth Mechanism of Porous Anodic Oxide Films—Anodizing of Aluminum and Magnesium—," Journal of the Surface Science Society of Japan, 1998, vol. 19, No. 12, p. 790-p. 798.

International Preliminary Report on Patentability dated Aug. 20, 2020 for PCT/JP2018/044298.

* cited by examiner

Fig.5
(a) 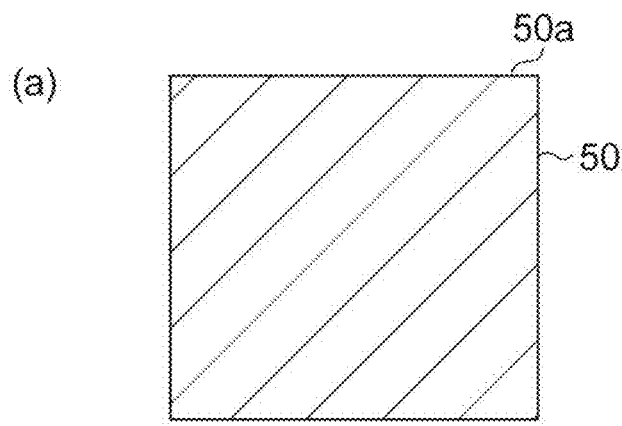
(b) 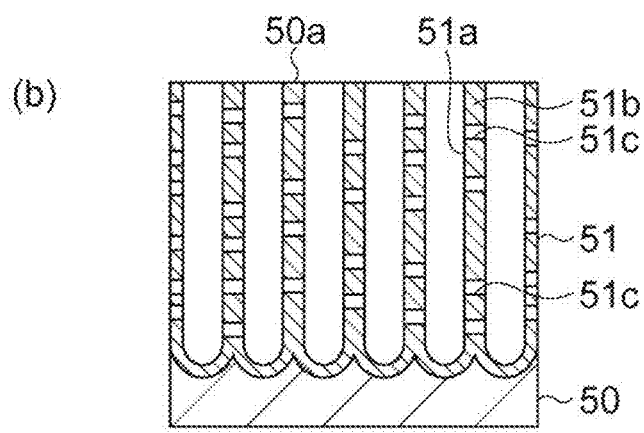
(c) 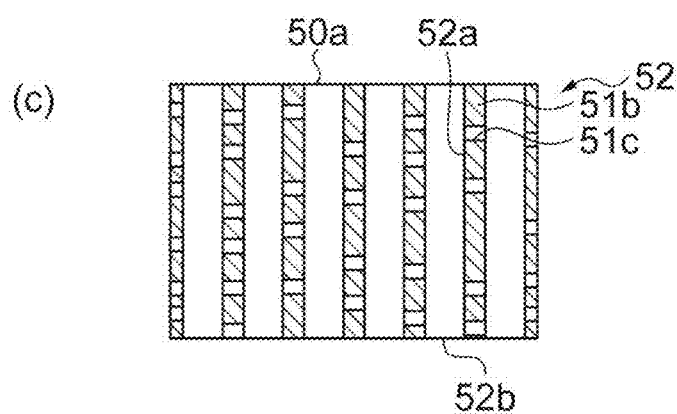

Fig.10
(a) 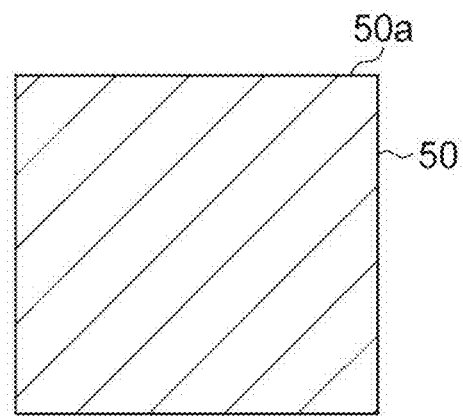
(b) 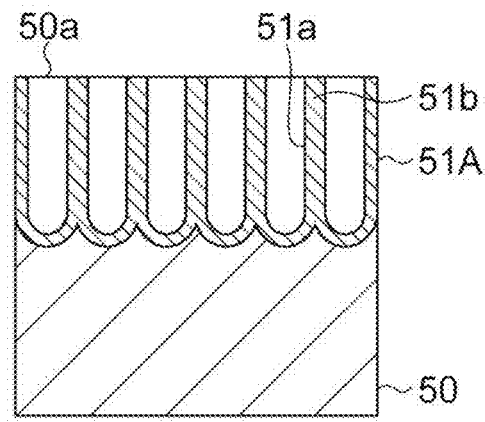
(c) 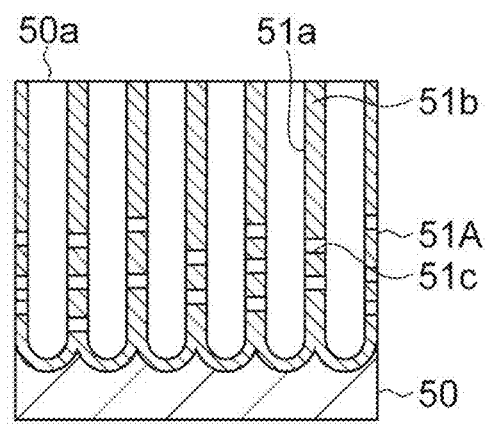
(d) 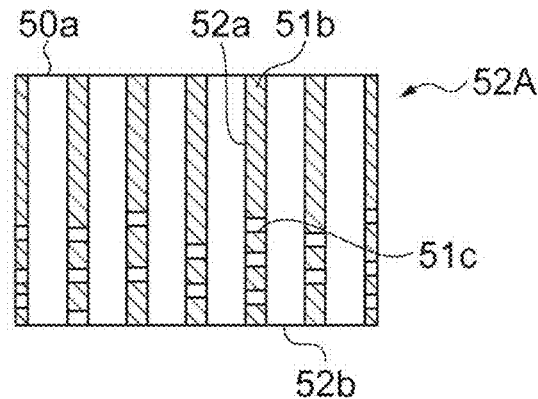

SAMPLE SUPPORT, AND MANUFACTURING METHOD OF SAMPLE SUPPORT

TECHNICAL FIELD

The present disclosure relates to a sample support body and a manufacturing method of a sample support body.

BACKGROUND ART

In the related art, a sample support body for ionizing a sample is known in mass spectrometry of a sample such as a biological sample (for example, refer to Patent Literature 1). Such a sample support body includes a substrate formed with a plurality of through holes opening to a first surface and a second surface opposite to each other.

CITATION LIST

Patent Literature

Patent Literature 1: Japanese Patent No. 6093492

SUMMARY OF INVENTION

Technical Problem

In the mass spectrometry as described above, the sample (a sample ion) that is ionized is detected, and the mass spectrometry of the sample is performed on the basis of a detection result thereof. In such mass spectrometry, it is desirable to improve a signal intensity (a sensitivity).

Therefore, an object of the present disclosure is to provide a sample support body and a manufacturing method of a sample support body in which a signal intensity of a sample ion can be improved.

Solution to Problem

A sample support body according to one aspect of the present disclosure is a sample support body for ionizing a sample, including: a substrate formed with a plurality of first through holes opening to a first surface and a second surface opposite to each other; and a conductive layer provided at least on a peripheral portion of the first through hole in the first surface, in which in a partition portion provided between the adjacent first through holes, a plurality of second through holes communicating the adjacent first through holes are formed.

The sample support body includes the substrate formed with the plurality of first through holes opening to the first surface and the second surface opposite to each other. Accordingly, for example, in a case where the sample support body is disposed on a sample such as a biological sample such that the second surface faces the sample, it is possible to move the component of the sample from the second surface side of the substrate towards the first surface side through the first through hole by using a capillary action. Further, for example, in a case where the first surface of the substrate is irradiated with an energy ray such as laser beam, energy is transmitted to the component of the sample that is moved to the first surface side via the conductive layer, and thus, the component of the sample can be ionized. In addition, in the sample support body described above, in the partition portion provided between the adjacent first through holes, the plurality of second through holes communicating the adjacent first through holes are formed. Accordingly, it is also possible to move the component of the sample that is moved from the second surface side towards the first surface side through the first through hole to the other first through hole adjacent to the first through hole through the second through hole. Accordingly, the component of the sample that is sucked up from the second surface side to the first surface side can be detoured (moved through the other first through hole). As a result thereof, it is possible to accelerate the movement of the component of the sample from the second surface side to the first surface side. Accordingly, according to the sample support body described above, it is possible to improve a signal intensity of a sample ion.

The plurality of second through holes may be unevenly distributed on the second surface side of the substrate. For example, as described above, in a case where the second surface faces the sample, it is possible to suitably attain the detour of the component of the sample by the plurality of second through holes that are unevenly distributed on the second surface side. Further, the strength of the substrate can be ensured by a portion of the substrate on the first surface side on which the second through holes are not provided (or are less than those on the second surface side). Accordingly, according to the sample support body described above, it is possible to improve the signal intensity of the sample ion by the detour of the component of the sample and to improve the strength of the substrate.

A width of the second through hole may be smaller than a width of the first through hole. In this case, it is possible to ensure the strength of the substrate, compared to a case where the width of the second through hole is larger than or equal to the width of the first through hole.

The substrate may be formed by anodizing a valve metal or silicon. In this case, it is possible to suitably attain the movement of the component of the sample according to a capillary action by the substrate that is obtained by the anodizing of the valve metal or the silicon.

The width of the first through hole may be 1 nm to 700 nm, and the width of the second through hole may be 1 nm to 350 nm. In this case, it is possible to suitably attain the movement of the component of the sample according to the capillary action described above and the detour of the component of the sample.

A material of the conductive layer may be platinum or gold. In this case, it is possible to easily and stably apply a constant voltage to the conductive layer.

A sample support body according to another aspect of the present disclosure is a sample support body for ionizing a sample, including: a substrate having conductivity formed with a plurality of first through holes opening to a first surface and a second surface opposite to each other, in which in a partition portion provided between the adjacent first through holes, a plurality of second through holes communicating the adjacent first through holes are formed.

According to the sample support body, it is possible to omit the conductive layer and to obtain the same effects as those of the sample support body including the conductive layer described above.

A manufacturing method of a sample support body according to one aspect of the present disclosure is a manufacturing method of a sample support body for ionizing a sample, including: a first step of preparing a base substrate; a second step of forming an anodic oxide film provided with a plurality of concave portions on a first surface of the base substrate, by anodizing the base substrate; a third step of obtaining a substrate formed with a plurality of first through holes corresponding to each of the plurality of concave portions by peeling off the anodic oxide film, the plurality of first through holes opening to the first surface and a second surface opposite to the first surface; and a fourth step of providing a conductive layer at least on a peripheral portion of the first through hole in the first surface, in which in the second step, in a partition portion provided between the adjacent concave portions, a plurality of second through holes communicating the adjacent concave portions are formed.

According to the manufacturing method of a sample support body, described above, it is possible to easily obtain the substrate including the plurality of first through holes and the plurality of second through holes by the anodizing of the base substrate. As a result thereof, it is possible to easily manufacture a sample support body obtaining the effects as described above.

In the second step, the formation of the plurality of concave portions may be advanced by first anodic oxidation, and then, the formation of the plurality of concave portions may be further advanced and the plurality of second through holes may be formed, by second anodic oxidation that is anodic oxidation in a condition different from that of the first anodic oxidation. In this case, the first anodic oxidation is performed, and then, the second anodic oxidation is performed in a condition different from that of the first anodic oxidation, and thus, the formation of the concave portion mey advanced by the first anodic oxidation to a certain degree, and then, it is possible to form the second through hole while the formation of the concave portion is further advanced by the second anodic oxidation. Accordingly, it is possible to obtain the substrate in which the plurality of second through holes are unevenly distributed on the second surface side and to obtain the sample support body obtaining the effects as described above.

In the first anodic oxidation, a first voltage may be applied to the base substrate, in a state in which the base substrate is dipped in a first electrolytic solution, and in the second anodic oxidation, the first voltage may be applied to the base substrate, in a state in which the base substrate is dipped in a second electrolytic solution different from the first electrolytic solution. The width of the first through hole (a pore diameter) that is formed by the anodic oxidation depends on the size of an applied voltage. Accordingly, according to the configuration described above, it is possible to constantly retain the width of the first through hole by making the applied voltage (the first voltage) constant, in both of the first anodic oxidation and the second anodic oxidation.

In the first anodic oxidation, the first voltage may be applied to the base substrate, in a state in which the base substrate is dipped in the first electrolytic solution, and in the second anodic oxidation, a second voltage different from the first voltage may be applied to the base substrate, in a state in which the base substrate is dipped in the second electrolytic solution different from the first electrolytic solution. In this case, in a wide range of conditions, the electrolytic solution or the applied voltage is more flexibly selected, and thus, the plurality of second through holes can be unevenly distributed on the second surface side of the substrate.

A manufacturing method of a sample support body according to another aspect of the present disclosure is a manufacturing method of a sample support body for ionizing a sample, including: a first step of preparing a base substrate; a second step of forming an anodic oxide film provided with a plurality of concave portions on a first surface of the base substrate, by anodizing the base substrate; and a third step of obtaining a substrate having conductivity and formed with a plurality of first through holes corresponding to each of the plurality of concave portions by peeling off the anodic oxide film, the plurality of first through holes opening to the first surface and a second surface opposite to the first surface in which in the second step, in a partition portion provided between the adjacent concave portions, a plurality of second through holes communicating the adjacent concave portions are formed.

According to the manufacturing method of a sample support body, it is possible to omit the step of providing the conductive layer and to manufacture a sample support body obtaining the same effects as those of the sample support body including the conductive layer described above.

Advantageous Effects of Invention

According to the present disclosure, it is possible to provide a sample support body and a manufacturing method of a sample support body in which a signal intensity of a sample ion can be improved.

BRIEF DESCRIPTION OF DRAWINGS

FIG. 5 is a diagram illustrating a procedure of a manufacturing method of the substrate illustrated in FIG. 1.

FIG. 10 is a diagram illustrating a procedure of a manufacturing method of a substrate illustrated in FIG. 9.

DESCRIPTION OF EMBODIMENTS

Figure 1:
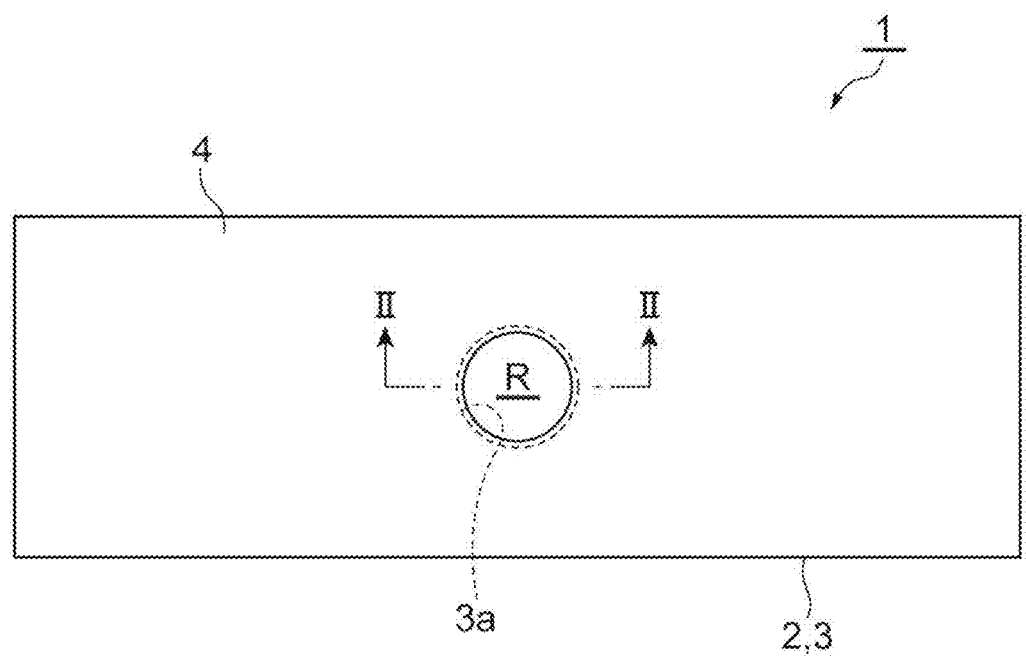
FIG. 1 is a plan view of a sample support body according to one embodiment.

Hereinafter, preferred embodiments of the present disclosure will be described in detail, with reference to the drawings. Note that, in each of the drawings, the same reference numerals will be applied to the same portions or the corresponding portions, and the repeated description will be omitted. In addition, dimensions or dimensional ratios of each member (or part) illustrated in the drawings may be different from actual dimensions or dimensional ratios in order to make the description easy to understand.

[Configuration of Sample Support Body]

Figure 2:
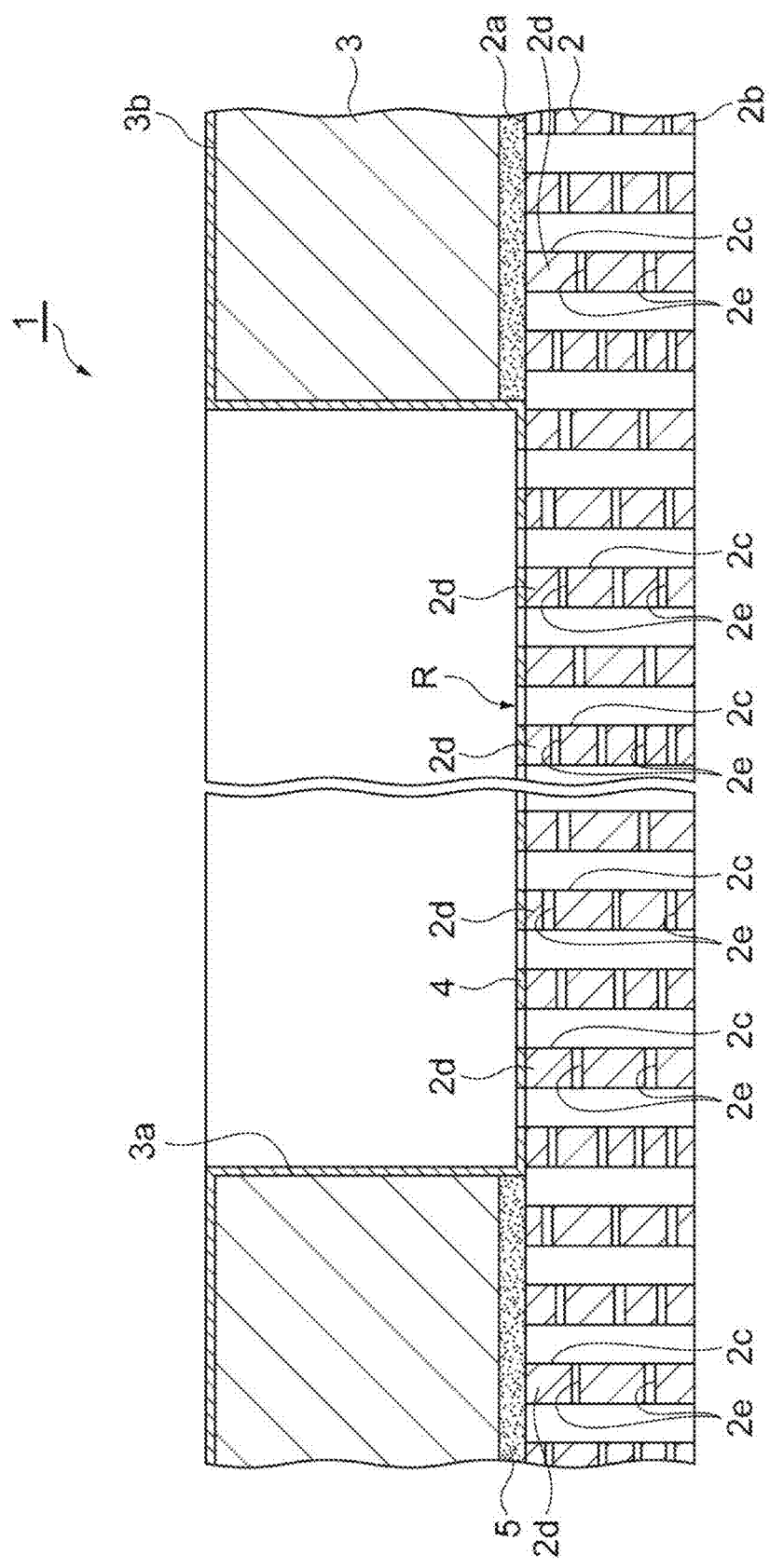
FIG. 2 is a sectional view of the sample support body along line II-II illustrated in FIG. 1.

As illustrated in FIG. 1 and FIG. 2, a sample support body 1 includes a substrate 2, a frame 3, and a conductive layer 4. The sample support body 1 is a sample support body for ionizing a sample. The sample support body 1, for example, is used for ionizing a component of a sample that is a measurement target, at the time of performing mass spectrometry. The substrate 2 includes a first surface 2a and a second surface 2b opposite to each other. A plurality of first through holes 2c are formed on the substrate 2 uniformly (with a homogeneous distribution). Each of the first through holes 2c extends along a thickness direction of the substrate 2 (a direction perpendicular to the first surface 2a and the second surface 2b), and opens to the first surface 2a and the second surface 2b. A plurality of second through holes 2e are formed on a partition portion 2d (a part of the substrate 2) provided between the adjacent first through holes 2c. The second through hole 2e communicates the adjacent first through holes 2c. The second through hole 2e is formed from the first surface 2a to the second surface 2b.

The substrate 2, for example, is formed of an insulating material into the shape of a rectangular plate. The length of one side of the substrate 2 when seen from the thickness direction of the substrate 2, for example, is approximately several cm, and the thickness of the substrate 2, for example, approximately 1 μm to 50 μm. The first through hole 2c, for example, is approximately in the shape of a circle when seen from the thickness direction of the substrate 2. The width of the first through hole 2c is 1 nm to 700 nm. The width of the first through hole 2c indicates the diameter of the first through hole 2c in a case where the first through hole 2c is approximately in the shape of a circle when seen from the thickness direction of the substrate 2, and indicates the diameter (an effective diameter) of a virtual maximum cylinder falling into the first through hole 2c in a case where the first through hole 2c is not approximately in the shape of a circle. A pitch between the respective first through holes 2c is 1 nm to 1000 nm. In a case where the first through hole 2c is approximately in the shape of a circle when seen from the thickness direction of the substrate 2, the pitch between the respective first through holes 2c indicates a center-to-center distance of the respective circles, and in a case where the first through hole 2c is not approximately in the shape of a circle, the pitch between the respective first through holes 2c indicates a center axis-to-center axis distance of the virtual maximum cylinder falling into the first through hole 2c.

A sectional shape of the second through hole 2e, for example, is an approximately circular shape. That is, the second through hole 2e, for example, has a cylindrical shape. The width of the second through hole 2e is smaller than the width of the first through hole 2c. For example, the width of the second through hole 2e is 1 nm to 350 nm. The width of the second through hole 2e indicates the diameter of the second through hole 2e in a case where the sectional shape of the second through hole 2e is an approximately circular shape, and indicates the diameter (an effective diameter) of a virtual maximum cylinder falling into the second through hole 2e in a case where the sectional shape of the second through hole 2e is not an approximately circular shape. A pitch between the respective second through holes 2e is smaller than the pitch between the respective first through holes 2c. The pitch between the respective second through holes 2e is 1 nm to 1000 nm. The pitch between the respective second through holes 2e indicates a center-to-center distance of the respective circles in a case where the second through hole 2e is approximately in the shape of a circle, and indicates a center axis-to-center axis distance of the virtual maximum cylinder falling into the second through hole 2e in a case where the second through hole 2e is not approximately in the shape of a circle.

The frame 3 is provided on the first surface 2a of the substrate 2. Specifically, the frame 3 is fixed to the first surface 2a of the substrate 2 by an adhesive layer 5. It is preferable that an adhesive material having less emitted gas (for example, glass with a low melting point, a vacuum adhesive agent, and the like) is used as the material of the adhesive layer 5. The frame 3 has approximately the same outer shape as that of the substrate 2 when seen from the thickness direction of the substrate 2. An opening 3a is formed in the frame 3. A portion corresponding to the opening 3a in the substrate 2 functions as an effective region R for moving the component of the sample described below to the first surface 2a side.

The frame 3, for example, is formed of an insulating material into the shape of a rectangular plate. The length of one side of the frame 3 when seen from the thickness direction of the substrate 2, for example, is approximately several cm, and the thickness of the frame 3, for example, is less than or equal to 1 mm. The opening 3a, for example, is in the shape of a circle when seen from the thickness direction of the substrate 2, and in such a case, the diameter of the opening 3a, for example, approximately several mm to several tens of mm. According to such a frame 3, the handling of the sample support body 1 is facilitated, and the deformation of the substrate 2 due to a temperature change or the like is suppressed.

The conductive layer 4 is provided on the first surface 2a of the substrate 2. Specifically, the conductive layer 4 is continuously (integrally) formed in a region corresponding to the opening 3a of the frame 3 in the first surface 2a of the substrate 2 (that is, a region corresponding to the effective region R), the inner surface of the opening 3a, and a surface 3b of the frame 3 on a side opposite to the substrate 2. In the effective region R, the conductive layer 4 is provided on a peripheral portion of the first through hole 2c in the first surface 2a. That is, in the effective region R, the conductive layer 4 covers a portion of the first surface 2a of the substrate 2 on which the first through hole 2c is not formed. That is, in the effective region R, each of the first through holes 2c is exposed to the opening 3a.

The conductive layer 4 is formed of a conductive material. Here, it is preferable that a metal having low affinity (reactivity) with respect to a sample and high conductivity is used as the material of the conductive layer 4, from the following reasons.

For example, in a case where the conductive layer 4 is formed of a metal such as copper (Cu) having high affinity with respect to a sample such as protein, in a process of ionizing the sample described below, the sample is ionized in a state where Cu atoms are attached to sample molecules, and thus, there is a concern that a detection result is shifted in a mass spectrometry method described below as the Cu atoms are attached. Therefore, it is preferable that a metal having low affinity with respect to the sample is used as the material of the conductive layer 4.

On the other hand, a metal having high conductivity easily and stably applies a constant voltage. For this reason, in a case where the conductive layer 4 is formed of the metal having high conductivity, it is possible to homogeneously apply a voltage to the first surface 2a of the substrate 2 in the effective region R. In addition, there is a tendency that the metal having high conductivity also has high thermal conductivity. For this reason, in a case where the conductive layer 4 is formed of the metal having high conductivity, it is possible to efficiently transfer the energy of an energy ray such as laser beam that is applied to the substrate 2 to the sample via the conductive layer 4. Therefore, it is preferable that the metal having high conductivity is used as the material of the conductive layer 4.

From the viewpoint described above, it is preferable that gold (Au), platinum (Pt), and the like are used as the material of the conductive layer 4. The conductive layer 4, for example, is formed to have a thickness of approximately 1 nm to 350 nm by a plating method, an atomic layer deposition (ALD) method, a vapor deposition method, a sputtering method, and the like. Note that, chromium (Cr), nickel (Ni), titanium (Ti), and the like may be used as the material of the conductive layer 4.

Figure 3:
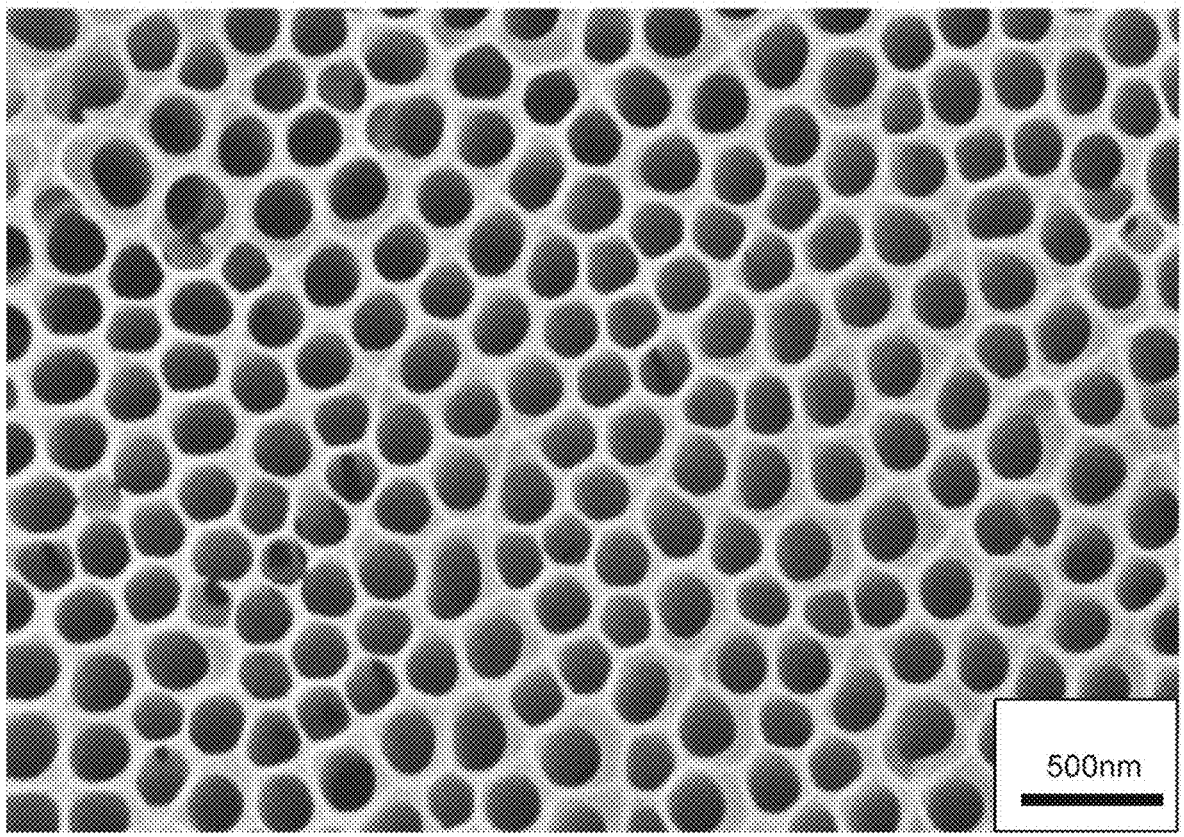
FIG. 3 is a diagram illustrating an enlarged image of a substrate when seen from a thickness direction of the substrate illustrated in FIG. 1.

FIG. 3 is a diagram illustrating an enlarged image of the substrate 2 when seen from the thickness direction of the substrate 2. In FIG. 3, a black portion is the first through hole 2c, and a white portion is the partition portion 2d between the first through holes 2c. As illustrated in FIG. 3, the plurality of first through holes 2c having an approximately constant width are uniformly formed on the substrate 2. It is preferable that an opening rate of the first through hole 2c in the effective region R (a ratio of all of the first through holes 2c to the effective region R when seen from the thickness direction of the substrate 2) is practically 10% to 80%, and is particularly 60% to 80%. The sizes of the plurality of first through holes 2c may be uneven with each other, and the plurality of first through holes 2c may be partially connected to each other.

Figure 4:
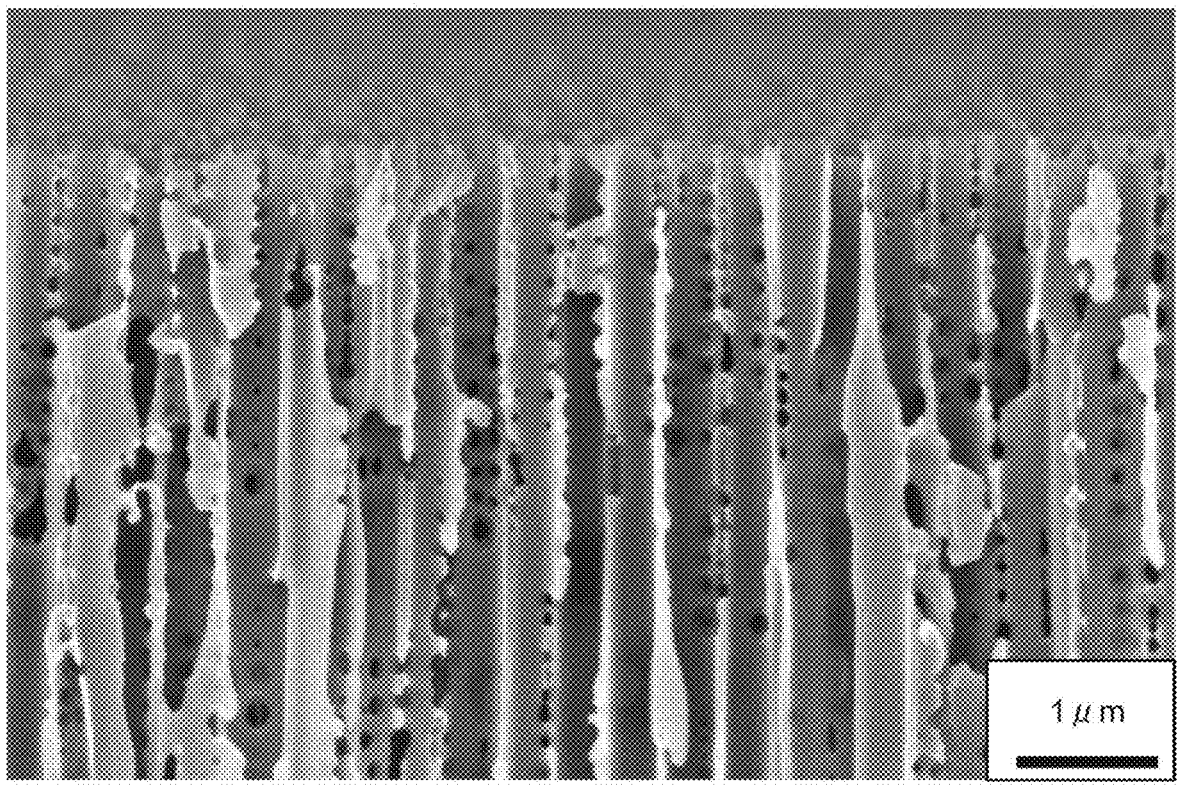
FIG. 4 is a diagram illustrating an enlarged image of a sectional surface of the substrate illustrated in FIG. 1.

FIG. 4 is a diagram illustrating an enlarged image of a sectional surface of the substrate 2. As illustrated in FIG. 4, in the partition portion 2d between the first through holes 2c (a portion having a color close to white, or the like), the plurality of second through holes 2e (black small holes) are formed. It is preferable that an opening rate of the second through hole 2e in the partition portion 2d between the first through holes 2c (a ratio of all of the second through holes 2e to the partition portion 2d when seen from a direction orthogonal to the partition portion 2d) is practically 10% to 80%, and is particularly 40% to 60%. The opening rate, for example, is a value in the case of being measured by an electron microscope. The sizes of the plurality of second through holes 2e may be uneven with each other, and the plurality of second through holes 2e may be partially connected to each other.

[Manufacturing Method of Sample Support Body]

Next, a manufacturing method of the sample support body 1 will be described with reference to FIG. 2 and FIG. 5. First, as illustrated in (a) of FIG. 5, a base substrate 50 is prepared (a first step). The material of the base substrate 50, for example, is aluminum (Al) having a purity of greater than or equal to 99.9% (3N). Subsequently, as illustrated in (b) of FIG. 5, the base substrate 50 is subjected to anodic oxidation, and thus, an anodic oxide film (an alumina porous film) 51 is formed in which a plurality of concave portions 51a are provided on a first surface 50a of the base substrate 50 (a second step). Specifically, first, the base substrate 50 is dipped in an electrolytic solution. Here, whether or not the second through hole 2e described above is formed by the anodic oxidation is determined in accordance with the type of electrolytic solution that is used in the anodic oxidation or the size of a treatment voltage (an applied voltage) (or a combination thereof). Therefore, in the second step, an electrolytic solution that is capable of forming a through hole 51c (a through hole to be the second through hole 2e) described below is used. Examples of such an electrolytic solution include a phosphoric acid, a tartaric acid, an etidronic acid, a citric acid, and the like. In this embodiment, as an example, a phosphoric acid is used as the electrolytic solution.

Subsequently, a voltage having a predetermined size is applied to the base substrate 50. The size of the applied voltage is determined in accordance with the electrolytic solution to be used. In a case where a phosphoric acid is used as the electrolytic solution, the size of the applied voltage can be selected from a voltage (volt) range (for example, 50 V to 200 V) suitable for a phosphoric acid. In a case where a voltage having a predetermined size included in the voltage range described above is applied to the base substrate 50, in a state where the base substrate 50 is dipped in the electrolytic solution (here, a phosphoric acid), the anodic oxide film 51 is formed on the first surface 50a. At this time, in a partition portion 51b (a part of the anodic oxide film 51) provided between the adjacent concave portions 51a, the plurality of through holes 51c communicating the adjacent concave portions 51a are formed.

Subsequently, as illustrated in (c) of FIG. 5, an anodic oxide film 52 is obtained by peeling off the anodic oxide film 51 from the base substrate 50 (a third step). At this time, a plurality of through holes 52a opening to the first surface 50a and a second surface 52b opposite to the first surface 50a are formed on the anodic oxide film 52, corresponding to each of the plurality of concave portions 51a. The anodic oxide film 52 corresponds to the substrate 2. Note that, a known pore widening treatment for widening the through hole 52a and the through hole 51c may be performed with respect to the anodic oxide film 52 described above. In this case, the anodic oxide film 52 after being subjected to the pore widening treatment corresponds to the substrate 2. The through hole 52a of the anodic oxide film 52 (in a case where the pore widening treatment is performed, the through hole 52a after widening) corresponds to the first through hole 2c of the substrate 2. The through hole 51c of the anodic oxide film 52 (in a case where the pore widening treatment is performed, the through hole 51c after widening) corresponds to the second through hole 2e of the substrate 2. Note that, the substrate 2 may be formed by anodizing a valve metal other than Al, such as tantalum (Ta), niobium (Nb), titanium (Ti), hafnium (Hf), zirconium (Zr), zinc (Zn), tungsten (W), bismuth (Bi), and antimony (Sb), or may be formed by anodizing silicon (Si). That is, such a valve metal or silicon may be used as the base substrate 50.

Subsequently, the frame 3 is fixed to the first surface 2a of the substrate 2 by the adhesive layer 5 (refer to FIG. 2). Subsequently, the conductive layer 4 is provided on the peripheral portion of the first through hole 2c in the first surface 2a of the substrate 2 (a fourth step). Specifically, the conductive layer 4 is formed in a region corresponding to the opening 3a of the frame 3 in the first surface 2a of the substrate 2, the inner surface of the opening 3a, and the surface 3b of the frame 3 on a side opposite to the substrate 2. The conductive layer 4 is formed not to block the first through hole 2c. As described above, the sample support body 1 is manufactured.

[Method for Ionizing Sample]

Figure 6:
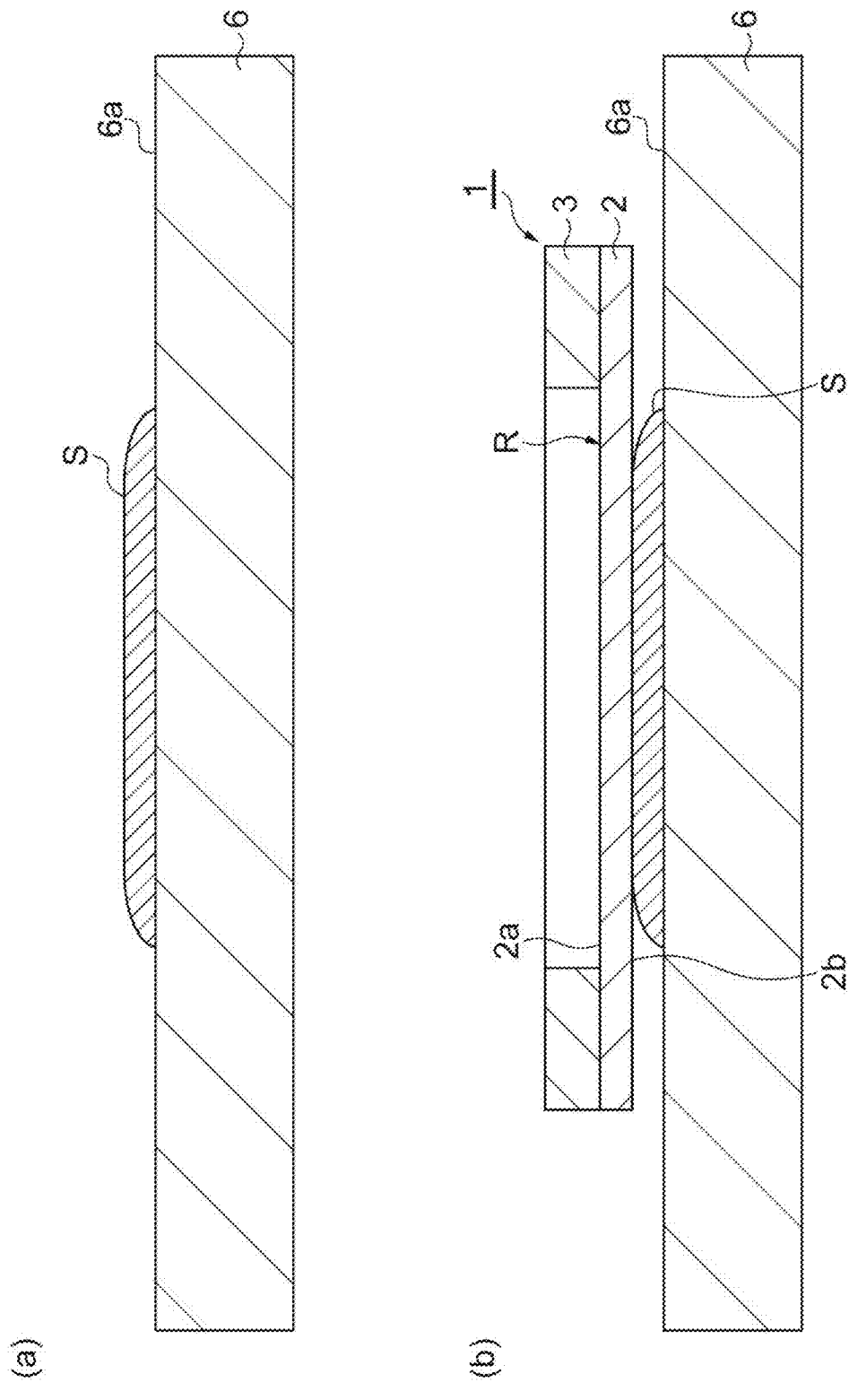
FIG. 6 is a diagram illustrating a procedure of a mass spectrometry method according to one embodiment.
Figure 7:
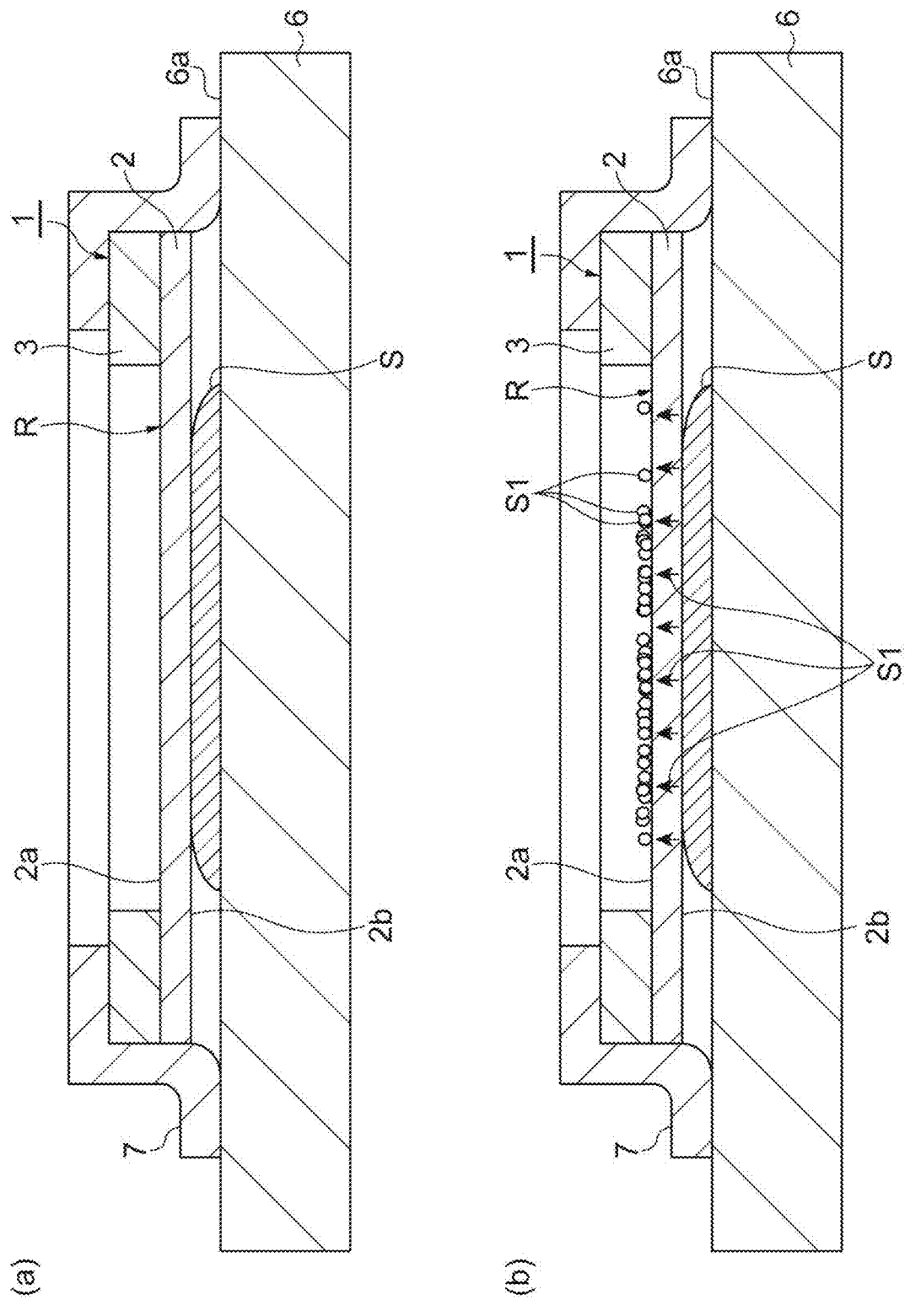
FIG. 7 is a diagram illustrating a procedure of a mass spectrometry method according to one embodiment.
Figure 8:
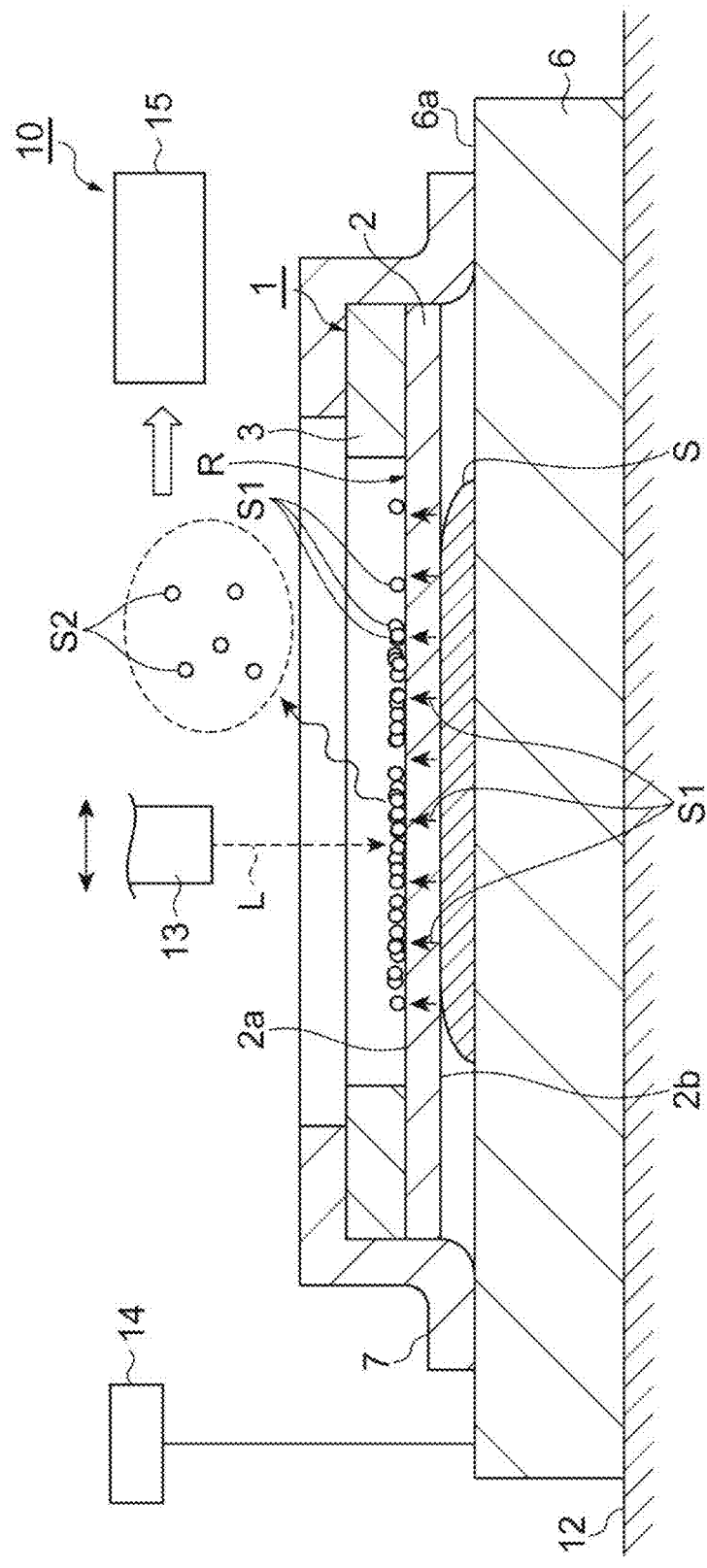
FIG. 8 is a diagram illustrating a procedure of a mass spectrometry method according to one embodiment.

Next, a method for ionizing a sample, using the sample support body 1, will be described with reference to FIG. 6 to FIG. 8. Here, as an example, a laser desorption/ionization method (a part of the mass spectrometry method of the mass spectrometry device 10) using laser beam (an energy ray) will be described. In FIG. 6 to FIG. 8, the first through hole 2c, the second through hole 2e, the conductive layer 4, and the adhesive layer 5 in the sample support body 1 are not illustrated. In addition, the sample support body 1 illustrated in FIG. 1 and FIG. 2 and the sample support body 1 illustrated in FIG. 6 to FIG. 8 have different dimensional ratios or the like, for convenience of illustration.

First, the sample support body 1 described above is prepared. The sample support body 1 may be prepared by being manufactured by a person who carries out an ionization method and the mass spectrometry method, or may be prepared by being acquired from a manufacturer, a seller, or the like of the sample support body 1.

Subsequently, as illustrated in (a) of FIG. 6, a sample S that is a mass spectrometry target is mounted on a mounting surface 6a of a glass slide (a mounting portion) 6. The glass slide 6 is a glass substrate on which a transparent conductive film such as an indium tin oxide (ITO) film is formed, and the surface of the transparent conductive film is the mounting surface 6a. Note that, not only the glass slide 6 but also a member that is capable of ensuring conductivity (for example, a substrate of a metal material such as stainless steel, or the like) can be used as the mounting portion.

Subsequently, as illustrated in (b) of FIG. 6, the sample support body 1 is disposed on the sample S such that the second surface 2b is in contact with the sample S. At this time, the sample S is disposed in the effective region R when seen from the thickness direction of the substrate 2. Here, the sample S, for example, is a biological sample (a hydrous sample). In order to smoothly move a component S1 of the sample S (refer to FIG. 7), a solution (for example, an acetonitrile mixed liquid, acetone, or the like) for decreasing the viscosity of the component S1 may be added to the sample S.

Subsequently, as illustrated in (a) of FIG. 7, in a state where the second surface 2b of the substrate 2 is brought into contact with the sample S, the sample support body 1 is fixed to the glass slide 6. The sample support body 1 is fixed to the glass slide 6 by a tape 7 (for example, a carbon tape or the like) having conductivity. Specifically, the tape 7 is in contact with the conductive layer 4 on the surface 3b of the frame 3 and is in contact with the mounting surface 6a of the glass slide 6, and thus, the sample support body 1 is fixed to the glass slide 6.

The tape 7 may be a part of the sample support body 1, or may be prepared separately from the sample support body 1. In a case where the tape 7 is a part of the sample support body 1 (that is, in a case where the sample support body 1 includes the tape 7), for example, the tape 7 may be fixed in advance to the first surface 2a side in a peripheral portion of the substrate 2. More specifically, the tape 7 may be fixed onto the conductive layer 4 that is formed on the surface 3b of the frame 3.

As illustrated in FIG. (b) of 7, the component S1 of the sample S is moved from the second surface 2b side of the sample support body 1 towards the first surface 2a side through each of the first through holes 2c (refer to FIG. 2) by a capillary action. At this time, a part of the component S1 that is moved in one first through hole 2c can be moved (detoured) to the other first through hole 2c that is adjacent to the one first through hole 2c through the second through hole 2e. The component S1 that is moved to the first surface 2a side of the substrate 2 is remained on the first surface 2a side by a surface tension.

Subsequently, as illustrated in FIG. 8, in a state where the sample S is disposed between the glass slide 6 and the sample support body 1, the glass slide 6, the sample support body 1, and the sample S are mounted on a support portion 12 (for example, a stage) of the mass spectrometry device 10. Subsequently, a voltage is applied to the conductive layer 4 of the sample support body 1 (refer to FIG. 2) via the mounting surface 6a of the glass slide 6 and the tape 7 by a voltage application unit 14 of the mass spectrometry device 10.

Subsequently, the first surface 2a of the substrate 2 is irradiated with the laser beam L through the opening 3a of the frame 3 by a laser beam irradiation unit 13 of the mass spectrometry device 10. That is, the laser beam L is applied to a region corresponding to the opening 3a of the frame 3 in the first surface 2a of the substrate 2 (that is, a region corresponding to the effective region R). Here, the laser beam irradiation unit 13 scans the region corresponding to the effective region R with the laser beam L. Note that, the scanning of the laser beam L with respect to the region corresponding to the effective region R can be performed by operating at least one of the support portion 12 and the laser beam irradiation unit 13.

As described above, the first surface 2a of the substrate 2 is irradiated with the laser beam L while a voltage is applied to the conductive layer 4, and thus, the component S1 that is moved to the first surface 2a side of the substrate 2 is ionized, and a sample ion S2 (the component S1 that is ionized) is emitted. Specifically, energy is transmitted from the conductive layer 4 (refer to FIG. 2) absorbing the energy of the laser beam L to the component S1 that is moved to the first surface 2a side of the substrate 2, and the component S1 obtaining the energy is gasified and obtains a charge, and thus, the sample ion S2 is obtained. Each of the steps described above corresponds to the method for ionizing the sample S, using the sample support body 1 (here, as an example, a laser desorption/ionization method as a part of the mass spectrometry method).

The sample ion S2 that is emitted is moved towards a ground electrode (not illustrated) that is provided between the sample support body 1 and an ion detection unit 15 while being accelerated. That is, the sample ion S2 is moved towards the ground electrode while being accelerated by a potential difference that occurs between the conductive layer 4 to which a voltage is applied and the ground electrode. Then, the sample ion S2 is detected by the ion detection unit 15 of the mass spectrometry device 10. Here, the ion detection unit 15 detects the sample ion S2 to correspond to a scanning position of the laser beam L. Note that, here, the mass spectrometry device 10 is a mass spectrometry device using a time-of-flight mass spectrometry (TOF-MS) method. Each of the steps described above corresponds to the mass spectrometry method using the sample support body 1.

As described above, the sample support body 1 includes the substrate 2 formed with the plurality of first through holes 2c opening to the first surface 2a and the second surface 2b opposite to each other. Accordingly, for example, in a case where the sample support body 1 is disposed on the sample S such as a biological sample such that the second surface 2b faces the sample S, the component S1 of the sample S can be moved from the second surface 2b side of the substrate 2 towards the first surface 2a side through the first through hole 2c by using a capillary action. Further, for example, in a case where the first surface 2a of the substrate 2 is irradiated with the laser beam L, energy is transmitted to the component S1 of the sample S that is moved to the first surface 2a side via the conductive layer 4, and thus, the component S1 of the sample S can be ionized. In addition, in the sample support body 1, in the partition portion 2d provided between the adjacent first through holes 2c, the plurality of second through holes 2e communicating the adjacent first through holes 2c are formed. Accordingly, the component S1 of the sample S that is moved from the second surface 2b side towards the first surface 2a side through the first through hole 2c can also be moved to the other first through hole 2c that is adjacent to the first through hole 2c through the second through hole 2e. Accordingly, the component S1 of the sample S that is sucked up from the second surface 2b side to the first surface 2a side can be detoured (moved through the other first through hole 2c). As a result thereof, it is possible to accelerate the movement of the component S1 of the sample S from the second surface 2b side to the first surface 2a side. Accordingly, according to the sample support body 1, in the mass spectrometry, it is possible to improve a signal intensity (a sensitivity).

The width of the second through hole 2e is smaller than the width of the first through hole 2c. Accordingly, it is possible to ensure the strength of the substrate 2, compared to a case where the width of the second through hole 2e is larger than or equal to the width of the first through hole 2c.

The substrate 2 is formed by anodizing a valve metal or silicon. For this reason, it is possible to suitably attain the movement of the component S1 of the sample S according to a capillary action by the substrate 2 that is obtained by the anodic oxidation of the valve metal or the silicon.

The width of the first through hole 2c is 1 nm to 700 nm, and the width of the second through hole 2e is 1 nm to 350 nm. Accordingly, it is possible to suitably attain the movement of the component S1 of the sample S according to the capillary action described above and the detour of the component S1 of the sample S.

The material of the conductive layer 4 is platinum or gold. For this reason, it is possible to easily and stably apply a constant voltage to the conductive layer 4.

According to the manufacturing method of the sample support body 1 described above, it is possible to easily obtain the substrate 2 including the plurality of first through holes 2c and the plurality of second through holes 2e by the anodic oxidation of the base substrate 50. As a result thereof, it is possible to easily manufacture the sample support body 1 described above.

Modification Example

As described above, the embodiments of the present disclosure have been described, but the present disclosure is not limited to the embodiments described above, and the present disclosure can be variously modified within a range not departing from the gist thereof.

Figure 9:
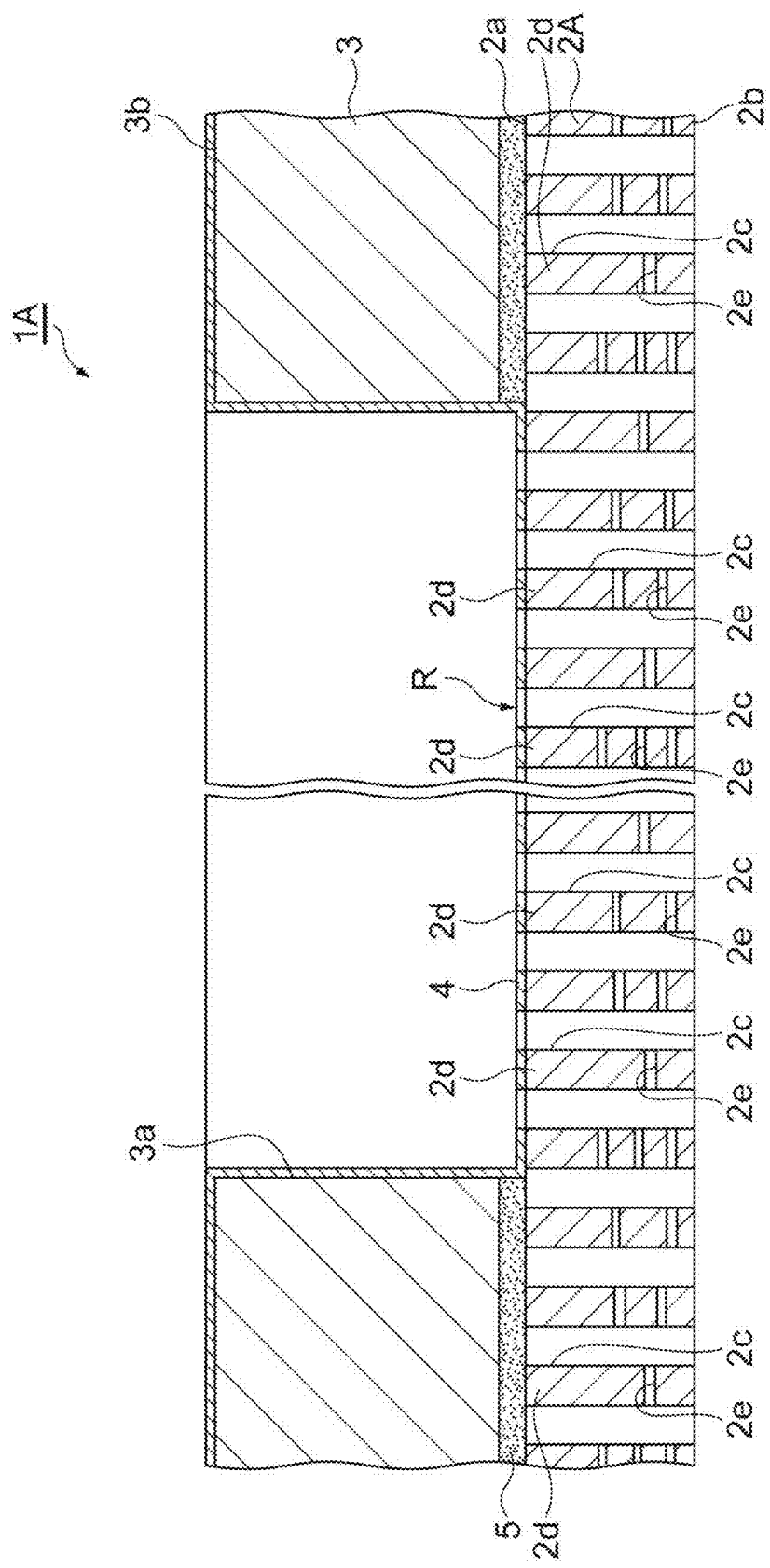
FIG. 9 is a sectional view of a sample support body according to a modification example.

FIG. 9 is a sectional view of a sample support body according to a modification example. As illustrated in FIG. 9, a sample support body 1A of the modification example is different from the sample support body 1, in that the sample support body 1A includes a substrate 2A. In the substrate 2A, the plurality of second through holes 2e are unevenly distributed on the second surface 2b side of the substrate 2A. Being unevenly distributed indicates that more second through holes 2e are formed on the second surface 2b side than on the first surface 2a side in the substrate 2A. For example, more second through holes 2e are formed in a region on the second surface 2b side with respect to a central portion of the substrate 2A in a thickness direction of the substrate 2A than in a region on the first surface 2a side with respect to the central portion. Note that, the second through hole 2e may not be formed in the region on the first surface 2a side with respect to the central portion. According to such a configuration, for example, as described above, in a case where the second surface 2b faces the sample, it is possible to suitably attain the detour of the component S1 of the sample S by the plurality of second through holes 2e that are unevenly distributed on the second surface 2b side. Further, the strength of the substrate 2A can be ensured by a portion of the substrate 2A on the first surface 2a side on which the second through holes 2e are not provided (or are less than those on the second surface 2b side). Accordingly, according to the sample support body 1A described above, it is possible to improve the signal intensity of the sample ion S2 by the detour of the component S1 of the sample S and to improve the strength of the substrate 2A.

Next, a manufacturing method of the sample support body 1A will be described. The manufacturing method of the sample support body 1A is different from the manufacturing method of the sample support body 1, in that a manufacturing method of the substrate 2A is different. Here, the manufacturing method of the substrate 2A will be described, and the other description will be omitted. First, as with the manufacturing method of the substrate 2, as illustrated in (a) of FIG. 10, the base substrate 50 is prepared (a first step). Subsequently, first anodic oxidation and second anodic oxidation that is anodic oxidation in a condition different from that of the first anodic oxidation are performed with respect to the base substrate 50, in a stepwise manner. Specifically, the formation of the plurality of concave portions 51a (portions to be the first through holes 2c) is advanced by the first anodic oxidation, and then, the formation of the plurality of concave portions 51a is further advanced and the plurality of through holes 51c (through holes to be the second through holes 2e) are formed, by the second anodic oxidation (a second step).

Specifically, first, as illustrated in (b) of FIG. 10, the formation of the plurality of concave portions 51a is advanced by the first anodic oxidation. In the first anodic oxidation, in a state where the base substrate 50 is dipped in a first electrolytic solution, a first voltage is applied to the base substrate 50. A combination of the first electrolytic solution and the first voltage is selected from combinations in which the formation of the concave portion 51a can be advanced, such that a horizontal hole communicating the adjacent concave portions 51a (that is, the through hole 51c) is not formed. Examples of the first electrolytic solution include a sulfuric acid, an oxalic acid, a malonic acid, and the like. In the modification example, as an example, a malonic acid is used as the first electrolytic solution. The first voltage can be selected from a voltage (volt) range (for example, 30 V to 150 V) suitable for anodic oxidation using a malonic acid. As illustrated in (b) of FIG. 10, the first voltage is applied to the base substrate 50, in a state where the base substrate 50 is dipped in the first electrolytic solution, an anodic oxide film 51A is formed in which the plurality of concave portions 51a are provided on the first surface 50a.

Subsequently, as illustrated in (c) of FIG. 10, the formation of the plurality of concave portions 51a is further advanced and the plurality of through holes 51c are formed, by the second anodic oxidation. Hereinafter, two examples of the second anodic oxidation will be described.

First Example

In a first example of the second anodic oxidation, in a state where the base substrate 50 is dipped in a second electrolytic solution that is different from the first electrolytic solution, the first voltage is applied to the base substrate 50. The second electrolytic solution is the same electrolytic solution that is used in the manufacturing method of the substrate 2. That is, an electrolytic solution in which the through holes 51c (through holes to be the second through holes 2e) described below can be formed is used as the second electrolytic solution. Examples of the second electrolytic solution include a phosphoric acid, a tartaric acid, an etidronic acid, a citric acid, and the like. In the first example, as an example, a phosphoric acid is used as the second electrolytic solution.

The first voltage, for example, is set to a voltage suitable for anodic oxidation using a malonic acid and anodic oxidation using a phosphoric acid. Here, there is an overlapping range (here, 50 V to 150 V) exists between a voltage range (for example, 30 V to 150 V) suitable for the anodic oxidation using a malonic acid and a voltage range (for example, 50 V to 200 V) suitable for the anodic oxidation using a phosphoric acid. That is, the size of the first voltage can be selected from the overlapping range. For example, the first voltage is 100 V. In a case where the first voltage is applied to the base substrate 50, in a state where the base substrate 50 is dipped in the second electrolytic solution, the formation of the plurality of concave portions 51a is further advanced. At this time, in a portion of the partition portion 51b (a part of the anodic oxide film 51A) between portions that are formed by the second anodic oxidation of the adjacent concave portions 51a, the plurality of through holes 51c communicating the adjacent concave portions 51a are formed.

Subsequently, as with the manufacturing method of the substrate 2, as illustrated in (d) of FIG. 10, an anodic oxide film 52A is obtained by peeling off the anodic oxide film 51A from the base substrate 50 (a third step). At this time, the plurality of through holes 52a opening to the first surface 50a and the second surface 52b opposite to the first surface 50a are formed on the anodic oxide film 52A, corresponding to each of the plurality of concave portions 51a. The anodic oxide film 52A corresponds to the substrate 2A. Note that, a known pore widening treatment for widening the through hole 52a and the through hole 51c may be performed with respect to the anodic oxide film 52A described above. In this case, the anodic oxide film 52A after being subjected to the pore widening treatment corresponds to the substrate 2A. The through hole 52a of the anodic oxide film 52A (in a case where the pore widening treatment is performed, the through hole 52a after widening) corresponds to the first through hole 2c of the substrate 2A. The through hole 51c of the anodic oxide film 52A (in a case where the pore widening treatment is performed, the through hole 51c after widening) corresponds to the second through hole 2e of the substrate 2A.

As described above, in the manufacturing method of the sample support body 1A, in the second step, the first anodic oxidation is performed, and then, the second anodic oxidation in a condition different from that of the first anodic oxidation is performed, and thus, the formation of the concave portion 51a is advanced by the first anodic oxidation to a certain degree, and then, it is possible to form the second through hole 2e while the formation of the concave portion 51a is further advanced by the second anodic oxidation. Accordingly, it is possible to obtain the substrate 2A in which the plurality of second through holes 2e are unevenly distributed on the second surface 2b side and to obtain the sample support body 1A obtaining the effects as described above.

Note that, the width of the first through hole 2c (a pore diameter) that is formed by the anodic oxidation depends on the size of the applied voltage. The width of the concave portion 51a is approximately directly proportional to the applied voltage. That is, for example, in a case where a voltage that is applied to the base substrate 50 increases, the width of the concave portion 51a that is formed on the first surface 50a of the base substrate 50 also increases. In addition, as described above, each of the electrolytic solutions is used within a voltage range suitable for each of the electrolytic solutions.

In the first anodic oxidation, in a case where the first voltage (in the example described above, a voltage selected from an overlapping range between a voltage range suitable for a malonic acid and a voltage range suitable for a phosphoric acid) is applied to the base substrate 50, in a state where the base substrate 50 is dipped in the first electrolytic solution (in the example described above, a malonic acid), in the second anodic oxidation, the first voltage is applied to the base substrate 50, in a state where the base substrate 50 is dipped in the second electrolytic solution (in the example described above, a phosphoric acid) that is different from the first electrolytic solution. Accordingly, according to the configuration described above, it is possible to constantly retain the width of the first through hole 2c by making the applied voltage (the first voltage) constant in both of the first anodic oxidation and the second anodic oxidation (that is, by changing only the electrolytic solution to be used).

Second Example

In a second example of the second anodic oxidation, a second voltage that is different from the first voltage is applied to the base substrate 50, in a state where the base substrate 50 is dipped in the second electrolytic solution. In the second example, as an example, a tartaric acid is used as the second electrolytic solution. The second voltage can be selected from a voltage range (for example, 100 V to 300 V) suitable for anodic oxidation using a tartaric acid. For example, the second voltage is 200 V. In a case where the second voltage is applied to the base substrate 50, in a state where the base substrate 50 is dipped in the second electrolytic solution, the formation of the plurality of concave portions 51a is further advanced. At this time, in the portion of the partition portion 51b between the portions that are formed by the second anodic oxidation of the adjacent concave portions 51a, the plurality of through holes 51c communicating the adjacent concave portions 51a are formed. According to such a configuration, in a wide range of conditions, the electrolytic solution or the applied voltage is more flexibly selected, and thus, the plurality of second through holes 2e can be unevenly distributed on the second surface 2b side of the substrate 2A.

The conductive layer 4 may not be provided on the second surface 2b and the inner surface of the first through hole 2c of the substrates 2 and 2A, and may be provided on the second surface 2b and the inner surface of the first through hole 2c of the substrates 2 and 2A. That is, the conductive layer 4 may be provided at least on the peripheral portion of the first through hole 2c in the first surface 2a of the substrates 2 and 2A.

The substrates 2 and 2A may have conductivity, and in the mass spectrometry method, a voltage may be applied to the substrates 2 and 2A. In a case where the substrates 2 and 2A have conductivity, it is possible to omit the conductive layer 4 from the sample support bodies 1 and 1A and to obtain the same effects as those in the case of using the sample support bodies 1 and 1A including the conductive layer 4 described above.

The material of the base substrate 50, for example, may be Al having a purity of less than or equal to 99.5% by being mixed with impurities such as Cu, iron (Fe), and Zn. In this case, it is preferable that the purity of Al is 99.0% to 99.5%. In a case where Al mixed with the impurities is subjected to anodic oxidation, heat is generated in a peripheral portion of the impurities by electrolytic polishing. The plurality of through holes 51c are formed in a site of the partition portion 51b in which the impurities are mixed, by the heat. Accordingly, in the case of using the base substrate 50 formed of such a material, anodic oxidation is performed with respect to the base substrate 50 in a combination of an arbitrary electrolytic solution and a voltage, and thus, it is possible to obtain the substrate 2 formed with the plurality of through holes 51c.

The width of the second through hole 2e may be larger than or equal to the width of the first through hole 2c. The pitch between the respective second through holes 2e may be greater than or equal to the pitch between the respective first through holes 2c.

In addition, the application of the sample support body 1 is not limited to the ionization of the sample S by the irradiation of the laser beam L. The sample support body 1 may be used in the ionization of the sample S by the irradiation of the energy ray other than the laser beam L (for example, an ion beam, an electron beam, and the like).

The sample support body 1 may be fixed to the glass slide 6 by means other than the tape 7 (for example, means using an adhesive agent, a fixing tool, or the like). In addition, in the mass spectrometry method, a voltage may be applied to the conductive layer 4 without using the mounting surface 6a of the glass slide 6 and the tape 7. In this case, the glass slide 6 and the tape 7 may not have conductivity.

The method for ionizing a sample described above can be used not only in the mass spectrometry of the molecules configuring the sample S, but also in other measurements and tests such as ion mobility measurement.

The opening 3a of the frame 3 may have various shapes when seen from the thickness direction of the substrate 2. The shape of the opening 3a of the frame 3, for example, may be a rectangular shape.

The sample S may be a dry sample. In this case, in order to move the component S1 of the sample S from the second surface 2b side of the substrate 2 to the first surface 2a side by a capillary action, for example, a solvent (for example, an acetonitrile mixed liquid, acetone, or the like) may be added to the sample S.

In the mass spectrometry method, the sample S may be directly mounted on the support portion 12 of the mass spectrometry device 10. At this time, the support portion 12 of the mass spectrometry device 10 corresponds to the glass slide 6.

REFERENCE SIGNS LIST 1, 1A: sample support body, 2, 2A: substrate, 2a, 50a: first surface, 2b, 52b: second surface, 2c, 52a: first through hole, 2d: partition portion, 2e, 51c: second through hole, 4: conductive layer, 50: base substrate, 51, 51A, 52, 52A: anodic oxide film, 51a: concave portion, S: sample.

The invention claimed is:

1. A sample support body for ionizing a sample, comprising:
a substrate formed with a plurality of first through holes opening to a first surface and a second surface opposite to each other, each of the plurality of first through holes extending along a direction perpendicular to the first surface; and
a conductive layer provided at least on a peripheral portion of the first through hole in the first surface,
wherein in a partition portion provided between the adjacent first through holes, a plurality of second through holes communicating the adjacent first through holes are formed.

2. The sample support body according to claim 1, wherein the plurality of second through holes are unevenly distributed on the second surface side of the substrate.

3. The sample support body according to claim 1, wherein a width of the second through hole is smaller than a width of the first through hole.

4. The sample support body according to claim 1, wherein the substrate is formed by anodizing a valve metal or silicon.

5. The sample support body according to claim 1, wherein the width of the first through hole is 1 nm to 700 nm, and
the width of the second through hole is 1 nm to 350 nm.

6. The sample support body according to claim 1, wherein a material of the conductive layer is platinum or gold.

7. A sample support body for ionizing a sample, comprising:
a substrate having conductivity formed with a plurality of first through holes opening to a first surface and a second surface opposite to each other, each of the plurality of first through holes extending along a direction perpendicular to the first surface,
wherein in a partition portion provided between the adjacent first through holes, a plurality of second through holes communicating the adjacent first through holes are formed.

8. A manufacturing method of a sample support body for ionizing a sample, comprising:
a first step of preparing a base substrate;
a second step of forming an anodic oxide film provided with a plurality of concave portions on a first surface of the base substrate, by anodizing the base substrate, each of the plurality of concave portions extending along a direction perpendicular to the first surface;
a third step of obtaining a substrate formed with a plurality of first through holes corresponding to each of the plurality of concave portions by peeling off the anodic oxide film, the plurality of first through holes opening to the first surface and a second surface opposite to the first surface; and
a fourth step of providing a conductive layer at least on a peripheral portion of the first through hole in the first surface,
wherein in the second step, in a partition portion provided between the adjacent concave portions, a plurality of second through holes communicating the adjacent concave portions are formed.

9. The manufacturing method of a sample support body according to claim 8,
wherein in the second step, the formation of the plurality of concave portions is advanced by first anodic oxidation, and then, the formation of the plurality of concave portions is further advanced and the plurality of second through holes are formed, by second anodic oxidation that is anodic oxidation in a condition different from that of the first anodic oxidation.

10. The manufacturing method of a sample support body according to claim 9,
wherein in the first anodic oxidation, a first voltage is applied to the base substrate, in a state in which the base substrate is dipped in a first electrolytic solution, and
in the second anodic oxidation, the first voltage is applied to the base substrate, in a state in which the base substrate is dipped in a second electrolytic solution different from the first electrolytic solution.

11. The manufacturing method of a sample support body according to claim 9,
wherein in the first anodic oxidation, a first voltage is applied to the base substrate, in a state in which the base substrate is dipped in a first electrolytic solution, and
in the second anodic oxidation, a second voltage different from the first voltage is applied to the base substrate, in a state in which the base substrate is dipped in a second electrolytic solution different from the first electrolytic solution.

12. A manufacturing method of a sample support body for ionizing a sample, comprising:
   a first step of preparing a base substrate;
   a second step of forming an anodic oxide film provided with a plurality of concave portions on a first surface of the base substrate, by anodizing the base substrate, each of the plurality of concave portions extending along a direction perpendicular to the first surface; and
   a third step of obtaining a substrate having conductivity and formed with a plurality of first through holes corresponding to each of the plurality of concave portions by peeling off the anodic oxide film, the plurality of first through holes opening to the first surface and a second surface opposite to the first surface,
   wherein in the second step, in a partition portion provided between the adjacent concave portions, a plurality of second through holes communicating the adjacent concave portions are formed.

13. The sample support body according to claim 1,
   wherein each of the plurality of first through holes has a circular shape when viewed from the direction perpendicular to the first surface.

* * * * *